United States Patent
Torgerson et al.

(10) Patent No.: US 9,431,790 B2
(45) Date of Patent: Aug. 30, 2016

(54) INTRACAVITY PUMPED OPO SYSTEM

(71) Applicants: Justin Torgerson, Bozeman, MT (US);
Charles Lokey, Bozeman, MT (US);
Laine McNeil, Bozeman, MT (US);
Patrick Maine, Bozeman, MT (US);
Mark Enright, Bozeman, MT (US)

(72) Inventors: Justin Torgerson, Bozeman, MT (US);
Charles Lokey, Bozeman, MT (US);
Laine McNeil, Bozeman, MT (US);
Patrick Maine, Bozeman, MT (US);
Mark Enright, Bozeman, MT (US)

(73) Assignee: Quantel USA, Bozeman, MT (US)

( * ) Notice: Subject to any disclaimer, the term of this patent is extended or adjusted under 35 U.S.C. 154(b) by 0 days.

(21) Appl. No.: 14/684,114

(22) Filed: Apr. 10, 2015

(65) Prior Publication Data

US 2016/0036195 A1    Feb. 4, 2016

Related U.S. Application Data

(60) Provisional application No. 61/978,470, filed on Apr. 11, 2014.

(51) Int. Cl.
| | |
|---|---|
| *H01S 3/10* | (2006.01) |
| *H01S 3/108* | (2006.01) |
| *H01S 3/094* | (2006.01) |
| *G02F 1/39* | (2006.01) |
| *H01S 3/16* | (2006.01) |
| *H01S 3/17* | (2006.01) |
| *H01S 3/081* | (2006.01) |
| *H01S 3/082* | (2006.01) |
| *H01S 3/0941* | (2006.01) |
| *H01S 3/115* | (2006.01) |
| *H01S 3/02* | (2006.01) |

(52) U.S. Cl.
CPC ............... *H01S 3/1083* (2013.01); *G02F 1/39* (2013.01); *H01S 3/094038* (2013.01); *H01S 3/108* (2013.01); *H01S 3/025* (2013.01); *H01S 3/082* (2013.01); *H01S 3/0811* (2013.01); *H01S 3/0813* (2013.01); *H01S 3/09415* (2013.01); *H01S 3/115* (2013.01); *H01S 3/1611* (2013.01); *H01S 3/1643* (2013.01); *H01S 3/1673* (2013.01); *H01S 3/17* (2013.01)

(58) Field of Classification Search
CPC ................. H01S 3/1083; H01S 3/108; H01S 3/094038; H01S 3/09415; H01S 3/1611; H01S 3/1643; H01S 3/1673; H01S 3/17
USPC ............................................... 372/22, 41, 71
See application file for complete search history.

(56) References Cited

U.S. PATENT DOCUMENTS

| | | | | |
|---|---|---|---|---|
| 6,304,237 | B1* | 10/2001 | Karakawa | G02F 1/3532 345/83 |
| 7,991,026 | B2* | 8/2011 | Caprara | H01S 3/1083 372/100 |
| 2002/0080841 | A1* | 6/2002 | Yin | H01S 3/08045 372/75 |
| 2009/0141281 | A1* | 6/2009 | Stothard | G01N 21/35 356/437 |
| 2011/0116158 | A1* | 5/2011 | Dunn | H01S 3/107 359/330 |
| 2011/0150015 | A1* | 6/2011 | Zhou | H01S 3/1083 372/20 |
| 2012/0093179 | A1* | 4/2012 | Dunn | H01S 3/0823 372/21 |
| 2013/0294467 | A1* | 11/2013 | Moloney | H01S 3/10 372/20 |

\* cited by examiner

*Primary Examiner* — Kinam Park
(74) *Attorney, Agent, or Firm* — Beyer Law Group LLP; Paul Davis

(57) ABSTRACT

An OPO system is provided. The OPO system includes a pump laser and an OPO. The OPO is internal to the pump laser.

1 Claim, 2 Drawing Sheets

INTRACAVITY PUMPED OPO SYSTEM

BACKGROUND

1. Field of the Invention

This invention relates generally to OPO systems, and more particularly to OPO systems where the OPO is internal with the pump source.

1. Description of the Related Art

A number of sensing applications are moving towards the use of eyesafe near infrared laser systems (14xx nm-16xx nm (and possibly others)) in order to make the devices safer to use for general sensing applications by non-typical laser users under safely controlled laboratory conditions. To this, Quantel has designed a laser/OPO (optical parametric oscillator) system that operates across this tuning range, is tunable or can be operated at a fixed wavelength, is highly efficient, and can be pumped with a variety of sources. The primary application for the system described here is for LIBS (Laser Induced Breakdown Spectroscopy), but the described device could be used for a variety of other sensing applications.

The normal implementation of an eyesafe system is either through the use of direct generation of the light (via various exotic rare-earth doped crystalline materials), or through secondary generation of the light (via harmonic generation, sum or difference frequency mixing, etc. or via optical parametric oscillation (OPO) in nonlinear optical (NLO) materials).

Each of these processes has advantages and disadvantages. The use of direct generation via rare earth doped crystalline materials (flashlamp pumped, diode pumped, or other) is an effective way to generate various wavelength emissions for use in sensing. However, these materials are difficult to grow, often have poor efficiency, are susceptible to optical feedback, and are generally fixed in output wavelength. Secondary generation via harmonic or mixing processes, are inefficient, generally bulky, and complex to operate. Secondary generation via optical parametric oscillation, OPO pumped by a laser source, can be easy to implement, rugged, and easy to build but generally suffer from poor energy stability, short pulsewidths, and beam quality problems (poor uniformity, poor divergence, etc.).

SUMMARY

An object of the present invention is to provide intracavity pumping of an OPO. Another object of the present invention is to provide an OPO, and OPO system and its methods of use, that is internal to a pump source.

A further object of the present invention is to provide very high pump levels in an OPO system, and an OPO.

Yet another object of the present invention is to provide very high pump levels in an OPO system, and an OPO resulting from high intracavity fluences generated in a pump source.

Another object of the present invention is to provide an OPO and an OPO system, with very high efficiencies and high output energies or powers at lower pump energies or powers than those in extracavity pumped OPO's.

A further object of the present invention is to provide an intracavity pumped OPO with higher efficiency and better mode control for improved beam quality.

DETAILED DESCRIPTION

Figure 1:
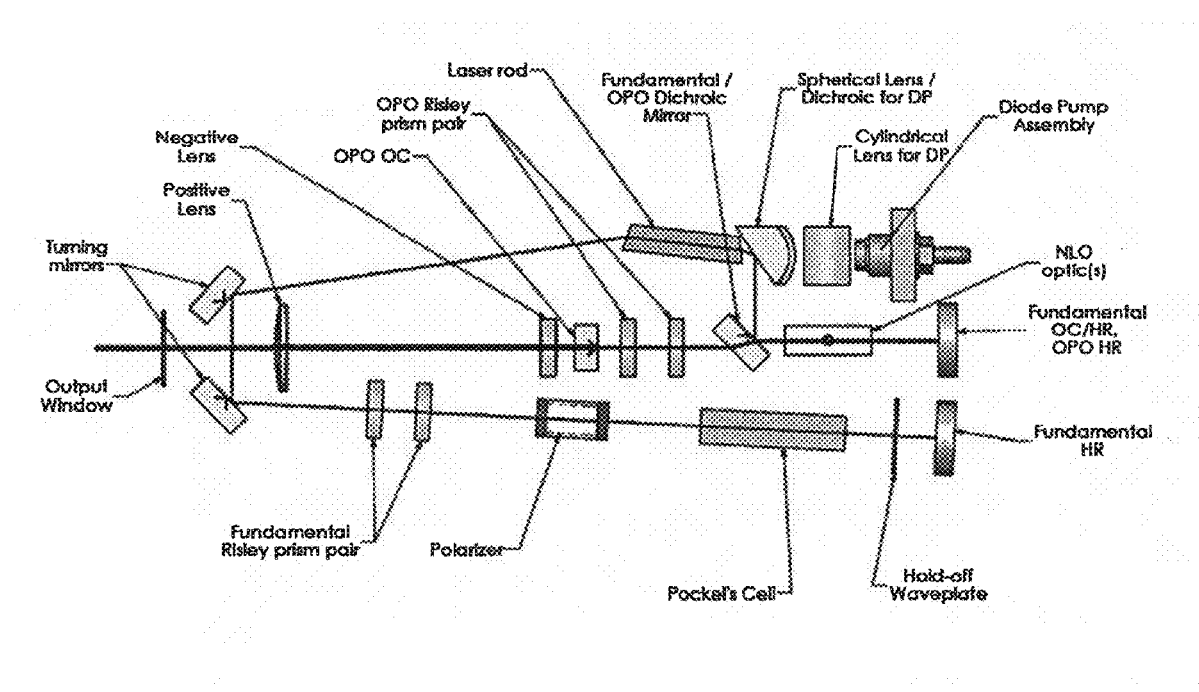
FIGS. 1 and 2 illustrates two embodiments of the present invention with an internal OPO in an OPO system.
Figure 2:
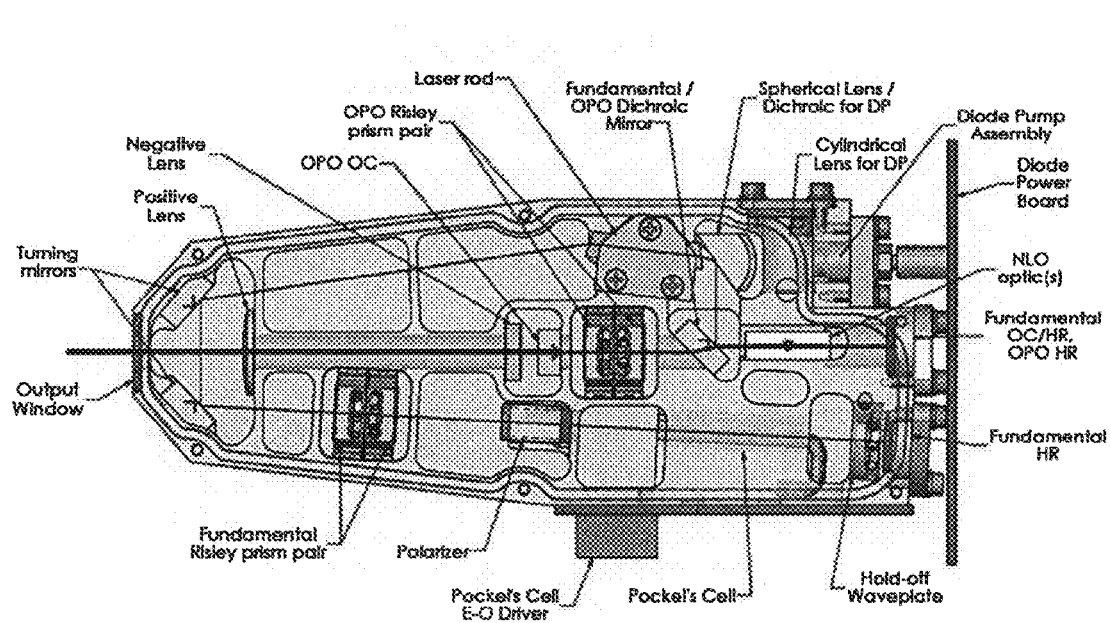

Referring to FIGS. 1 and 2, in one embodiment of the present invention an OPO system 10 is provided that an OPO 12 that is internal to a pump laser 14.

With the present invention, a "primary" generation of the light is achieved by moving the OPO 12 from being an external device attached to the pump laser 14 to being an internal part of the pump laser 14 itself.

With the present invention, intracavity pumping in the OPO system 10 of the OPO 12 allows for very high pump levels in the OPO 12 due to the high intracavity fluences generated in a normal laser system. Because the OPO process is nonlinear in nature, the high pump laser fluences result in very high OPO efficiencies and thus high output energies or powers at lower pump energies or powers than are seen in extracavity pumped OPO's.

For example, we have produced 12 mJ of energy in a ~10 ns pulse at 1574 nm with an input of 160 mJ at 808 nm in one of our implementations that uses diode laser end-pumping of Nd:YAG as the source. A typical external OPO will have an efficiency that is 10× or worse than this.

In addition, because of the opportunity for multiple passes in the pump laser 14, as a result of its intrinsic length, the intracavity pumped OPO 12 has higher efficiency and can have much better mode control for improved beam quality.

As non-limiting examples, beams have been produced with $M^2<2$ as compared with external implementations of the OPO that are usually 20× this value and have not been satisfactory.

In one embodiment of the present invention, the OPO 12 is used in spectroscopy applications, including but not limited to LIBS. With the OPO 12 of the present invention, the breakdown or spark wavelength is generated by the intracavity OPO. Back reflections into the cavity do not disrupt the oscillation of the pump laser and by virtue of the parametric oscillation process the OPO is insensitive to back reflections.

In many operations where a high intensity light source is focused to generate a spark or plasma, The generation of plasma can in certain circumstances cause a direct back reflection of the incident light beam. If this backward reflected light beam is incident upon the light source, it can become unstable and generate output intensity fluctuations. If the light source and spark or plasma are being used to make sensitive measurements, say for the purposes of sensing or spectroscopy, the quality of the generated data can be degraded, causing poor measurement performance. In the case of this embodiment, the primary oscillation source (laser) is separated from the output light source (OPO). In this case, if the light is back reflected from the spark or plasma, the oscillation of the OPO is not disrupted and the output energy remains stable, allowing for much higher quality measurements.

As a non-limiting example, one fundamental problem with breakdown based spectroscopy is that the physical generation of the spark causes the generation of a plasma. With the present invention, plasmas do not reflect incident light back in a direction of propagation. With the present invention, any back reflections from the plasma or spark have little or no effect on the primary oscillator (laser) and thus no effect on the OPO, and operational instabilities, including but not limited to energy fluctuations, beam profile variations, and the like.

As non-limiting examples, lifetimes of laser induced plasmas range from a few milliseconds to a few 10's of milliseconds. The pulse duration of the lasers used to ignite these plasmas can be a few nanoseconds although the gain medium retains some inversion for a time much longer than the pulse duration. When light is reflected back into the laser from the reflective plasma, it can excite additional laser action than interferes with the outgoing pulse. This interference can take the form of energy instability (most common) in the outgoing pulse and beam mode fluctuations (also common) that can change the temporal and transverse shape of the outgoing pulse. This leads to a nonrandom noise in the data that makes this type of plasma generation problematic for LIBS. Over time in higher energy laser sources, some fluctuations of the temporal and transverse profiles will eventually occur simultaneously in a way that will also cause catastrophic damage to the laser source itself.

In one embodiment of the present invention, the OPO 12 produces an OPO output 16 with low divergence and high beam quality, a very low M-squared over a wide range of environmental temperatures and a wide range of pulse repetition frequencies. AS non-limiting examples, the OPO 12 can be operated over PRF's from 0-120 Hz and was limited by the electrical power supply at the highest frequencies. In some embodiments, PRF's of kHz are reasonable can be achieved.

The intracavity OPO 12 generates low pulse to pulse energy output variations and stable long term output energy. As non-limiting examples, a long-term energy variation of less than 0.3% and a short-term variation from cold startup of less than 1% RMS is achieved.

With the present invention, the OPO 12 produces both a signal and an idler wavelength. Accordingly, the OPO system 10 can generate up to three separate output wavelengths, fundamental, signal, idler.

With the present invention, the OPO 12 is tunable, and the OPO system 10 can generate a wide variety (nearly infinite) of output wavelengths. How about "limited only by the available NLO materials that can be phase-matched to generate parametric output. A range that can be easily attained with current technology is 1400-4500 nm with source at 1064 nm. Sources at longer wavelengths can be used to access some longer wavelengths as well although these sources are not as well developed. IS As a non-limiting example, this can include eye-safe wavelengths. It will be appreciated that other wavelengths can also be produced depending on OPO system 10 designs.

The system can, (i) have fixed or tunable output wavelengths, (ii) be flashlamp or diode pumped, (iii) end or side pumped, (iv) passively or actively Q-switched.

In one embodiment, the fundamental cavity design of the OPO 10 can be either numerically stable, magnification less than or equal to one, or numerically unstable (magnification greater than one). In one embodiment, the OPO system can be operated with a variable output coupler that can be used to vary the output wavelength energies.

The system 10 generates less heat and requires less heat dissipation due to its efficiency. As a result of its high efficiency, the system 10 can be battery operated.

As a result of the system being able to be diode pumped, and its temperature insensitivity, it can be operated over a wide temperature range. The range is not limited directly by the OPO operation itself but is instead limited by operation of the source. Suitable sources have been made to operate in rugged environments that demand 24/7 operation from −30 to +70 C. In laboratory environments, sources have been made to operate over even larger ranges. Another result of diode pumping and efficiency, the system 10 can be run over a wide variety of pulse repetition frequencies (CW to kHz). In one embodiment the OPO 12 is operated over PRF's from 0-120 Hz and was limited by the electrical power supply at the highest frequencies. Modeling suggests that PRF's of kHz are reasonable to expect with small modifications.

As a non-limiting example, the OPO 12 can be built using a wide variety of NLO's and a wide variety of pump wavelengths. The OPO system can be implemented with a wide variety of fundamental laser materials, including but not limited to Nd:YAG, Nd:YLF, Nd:Glass, Ytterbium-Erbium, Nd:YVO$_4$, and the like. With the present invention, YAG and YLF are readily utilized.

As a result of the OPO 12 being intracavity in system 10, the desired output pulsewidths are relatively insensitive to variations in the fundamental pump cavity length. In fact, large increases and decreases in the cavity length will change the output pulsewidth with minimal effect on the efficiency and stability of the OPO. As non-limiting examples, the cavity lengths can be from 20-40 cm. As non-limiting examples, similar performance is observed for all output energies and PRF's for all energies that did not exceed the damage thresholds of the laser materials.

With the present invention, and it's fundamental design characteristics, the system 10, (i) can be operated in any orientation, (ii) s inherently rugged and can be sealed for a wide variety of environmental conditions, and (iii) is inexpensive to build.

The system 10 can be utilized for a variety of different applications, including but not limited to, to LIBS, spectroscopy, LIDAR, Ranging, Target designation, any application requiring eye safe laser wavelengths.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. Expected variations or differences in the results are contemplated in accordance with the objects and practices of the present invention. It is intended, therefore, that the invention be defined by the scope of the claims which follow and that such claims be interpreted as broadly as is reasonable.

The invention claimed is:

1. An OPO system, comprising:
   a diode end pump laser source producing a primary oscillation source; and
   an OPO internal to the pump laser, the OPO is being insensitive to back reflections, the primary oscillation source being separated from an output light source of the (OPO) with created plasmas being non-reflected incident light back in a direction of propagation and back reflections from the plasma and do not cause energy fluctuations or beam profile variations, wherein a long-term energy variation of less than 0.3% and a short-term variation from cold startup of less than 1% RMS is achieved.

* * * * *